US008024926B2

(12) United States Patent
Cheong

(10) Patent No.: US 8,024,926 B2

(45) Date of Patent: Sep. 27, 2011

(54) HYDRAULIC CIRCUIT FOR HEAVY EQUIPMENT

(75) Inventor: Hae Kyun Cheong, Pusan (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 542 days.

(21) Appl. No.: 12/246,515

(22) Filed: Oct. 7, 2008

(65) Prior Publication Data

US 2009/0094973 A1 Apr. 16, 2009

(30) Foreign Application Priority Data

Oct. 16, 2007 (KR) ........................ 10-2007-0104084

(51) Int. Cl.
*F16D 31/02* (2006.01)

(52) U.S. Cl. ................. 60/486; 60/329; 60/456; 60/484

(58) Field of Classification Search .................... 60/329, 60/420, 422, 456, 484, 486
See application file for complete search history.

(56) References Cited

U.S. PATENT DOCUMENTS 3,222,865 A * 12/1965 Miller ............................. 60/456
6,195,989 B1 * 3/2001 Hall et al. ....................... 60/329
7,155,907 B2 * 1/2007 Desjardins et al. ............. 60/329
* cited by examiner

*Primary Examiner* — Michael Leslie
(74) *Attorney, Agent, or Firm* — Ladas & Parry LLP

(57) ABSTRACT

A hydraulic circuit for heavy equipment is disclosed, which utilizes a hydraulic fluid supplied from a hydraulic pump for driving a cooling fan, as a pilot signal pressure, without installing a separate constant displacement pilot pump for supplying the pilot signal pressure to a control valve for controlling the hydraulic fluid to be supplied to a working device such as a boom. The hydraulic circuit includes first to third hydraulic pumps connected to an engine; a first control valve installed in a flow path of the first hydraulic pump; a second control valve installed in a flow path of the second hydraulic pump; a hydraulic motor connected to the third hydraulic pump; a cooling fan, connected to the hydraulic motor, for discharging cooling wind to an oil cooler; a temperature sensor for detecting a temperature of the hydraulic fluid in the hydraulic tank; an electric relief valve, installed in a drain flow path of the third hydraulic pump, for variably controlling a rotation velocity of the cooling fan; a controller for controlling the hydraulic pressure that drives the hydraulic motor; and a pilot pressure generator, installed in a pilot flow path branched and connected to a flow path of the third hydraulic pump, for supplying a pilot signal pressure to the first and second control valves when shifting.

4 Claims, 3 Drawing Sheets

HYDRAULIC CIRCUIT FOR HEAVY EQUIPMENT

CROSS-REFERENCE TO RELATED APPLICATION

This application is based on and claims priority from Korean Patent Application No. 10-2007-0104084, filed on Oct. 16, 2007 in the Korean Intellectual Property Office, the disclosure of which is incorporated herein in its entirety by reference.

BACKGROUND OF THE INVENTION

1. Field of the Invention

The present invention relates to a hydraulic circuit for heavy equipment which can utilize a part of flow rate of a hydraulic pump that drives a hydraulic pump for a cooling fan, as a hydraulic power source of remote control valve lever, and more particularly, to a hydraulic circuit for heavy equipment which can utilize a hydraulic fluid supplied from a hydraulic pump that drives a cooling fan, as a pilot signal pressure, without installing a constant displacement pilot pump for supplying the pilot signal pressure to a control valve that controls the hydraulic fluid to be supplied to a working device such as a boom.

2. Description of the Prior Art

FIG. 1 shows a conventional hydraulic circuit for heavy equipment comprising first and second variable displacement hydraulic pumps 2 and 3 and third and fourth constant displacement hydraulic pumps 4 and 15 which are connected to an engine 1; a first control valve 5 installed in a flow path of the first variable displacement hydraulic pump 2 and controlling the hydraulic fluid to be supplied to an actuator that drives a working device, such as a boom, a bucket, a traveling device, or the like, by using a pilot signal pressure supplied from the fourth hydraulic pump 15; a second control valve 5*a* installed in a flow path of the second variable displacement hydraulic pump 3 and controlling a hydraulic fluid to be supplied to an actuator that drives a working drive, such as a swivel device, an arm, a traveling device, or the like, by using a pilot signal pressure supplied from the fourth hydraulic pump 15; a hydraulic motor 9 connected to the third constant displacement hydraulic pump 4; a cooling fan 10, connected to and rotated by the hydraulic motor 9, for discharging cooling wind towards an oil cooler 11 to lower a temperature of the hydraulic fluid drained to a hydraulic tank T through a return flow path 16; a temperature sensor 13 for detecting the temperature of the hydraulic fluid of the hydraulic tank T; an electric relief valve 12, installed in a drain flow path 17 of the third hydraulic pump 4, for controlling the hydraulic pressure that drives the hydraulic motor 9, to variably control rotation velocity of the cooling fan 10; and a controller 14 for varying a set pressure of the electric relief valve 12 in response to a detected signal from the temperature sensor 13 to control the hydraulic pressure that drives the hydraulic motor 9.

In case where the first and second control valves 5 and 5*a* are switched by the pilot signal pressure supplied from the fourth hydraulic pump 15 in accordance with the switching of a pilot pressure generator 6, the inner spools of the first and second control valves 5 and 5*a* controlling the hydraulic fluid supplied to the actuator from the first and second hydraulic pumps 2 and 3 will not be shown and described herein.

The pilot pressure generator 6 is connected to the fourth constant displacement hydraulic pump 15, and generates the pilot signal pressure to a driver at the switching. Reference numeral 6 denotes a relief valve installed in the flow path 18 of the fourth hydraulic pump 15 and draining the hydraulic fluid to the hydraulic tank T when a load exceeding the pressure set in the fourth hydraulic pump 15 generates.

As the inner spools of the first and second control valves 5 and 5*a* are shifted in accordance with the switching of the respective pilot pressure generator, the working device such as a boom is driven by the hydraulic fluid supplied to the actuator from the first hydraulic pump 2, and the swivel device is driven by the hydraulic fluid supplied to the actuator (e.g. a swing motor) from the second hydraulic pump 3.

The hydraulic motor 9 is driven by the hydraulic fluid supplied from the third hydraulic pump 4 along the drain path 17, and as the cooling fan 10 is driven by the hydraulic motor 9, the temperature of the hydraulic fluid passing through the oil cooler 11 installed in a return path 16 and returned to the hydraulic tank T.

The intensity of cooling blast discharged from the cooling fan 10 to the oil cooler 11 is in proportion to the rotation velocity of the cooling fan 10, and as the rotation velocity of the cooling fan 10 is increased, the load pressure of the hydraulic motor 9 is proportionally increased.

In this instance, the load pressure of the hydraulic motor 9 is controlled by the electric relief valve 12. More specifically, if the load pressure of the hydraulic fluid supplied to the hydraulic motor 9 from the third hydraulic pump 4 exceeds the set pressure of the electric relief valve 12, the hydraulic fluid supplied from the third hydraulic pump 4 passes through the electric relief valve 12 and is drained to the hydraulic tank T. Consequently, the rotation velocity of the cooling fan 10 is controlled by the set pressure of the electric relief valve 12.

The temperature of the hydraulic fluid is raised when the working device such as a boom is driven. When the hydraulic fluid returned to the hydraulic tank T from the actuator passes through the oil cooler 11 installed in the return path, the temperature of the hydraulic fluid is lowered by the cool blast discharged from the cooling fan 10.

More specifically, as the detected signal corresponding to the temperature of the hydraulic fluid of the hydraulic tank T which is detected by the temperature sensor 13 is put in the controller 14, the controller 14 varies the set pressure by transmitting the control signal to the electric relief valve 12 so as to maintain the temperature of the hydraulic fluid in a set value.

For example, if the temperature of the hydraulic fluid stored in the hydraulic tank T exceeds the set temperature, the controller increases the set pressure of the electric relief valve 12 to increase the operation pressure which drives the hydraulic motor 9, thereby increasing the rotation velocity of the cooling fan 10 and thus improving the cooling capacity of the oil cooler 11.

With the conventional hydraulic circuit for the heavy equipment shown in FIG. 1, the fourth constant displacement hydraulic pump 15 discharges a constant amount of the hydraulic fluid in accordance with the rotation of the engine 1. The hydraulic fluid discharged from the fourth hydraulic pump 15 is momentarily used as the pilot signal pressure to switch the switch valves 5 and 5*a* when the pilot pressure generator 6 is switched.

When the load exceeding the set pressure is generated in the pilot flow path 18, the hydraulic fluid discharged from the fourth hydraulic pump 15 is drained to the hydraulic tank T through the relief valve 8, which leads to the power loss.

That is, power loss=(set pressure of relief valve 8)×(amount of hydraulic fluid to be drained to hydraulic tank T).

Since the pilot pump 15 is connected to the engine 1, the construction of the hydraulic circuit becomes complex, and a cost thereof is thus increased.

FIG. 2 shows another conventional hydraulic circuit for the heavy equipment.

The hydraulic circuit includes a hydraulic pump 50, an actuator 51 connected to the hydraulic pump 50, a solenoid valve 52 installed in a flow path 59 between the hydraulic pump 50 and the actuator 51 and controlling start, stop and direction change of the actuator 51, a sequence valve 56 installed in the first flow path 55 connecting a main inlet port 53 with a primary pressure outlet port 54, and a pressure reducing valve 58 installed in a secondary flow path 57 branched from the primary flow path 55 to constantly maintain the pressure of the secondary pressure output port 60.

With the construction of the conventional hydraulic circuit shown in FIG. 2, since the sequence valve 56 is installed in the flow path 59 between the hydraulic pump 50 and the solenoid valve 52, unnecessary power loss is incurred between the hydraulic pump 50 and the solenoid valve 52.

SUMMARY OF THE INVENTION

Accordingly, the present invention has been made to solve the above-mentioned problems occurring in the prior art while advantages achieved by the prior art are maintained intact.

One object of the present invention is to provide a hydraulic circuit for heavy equipment capable of preventing power loss by removing a separate constant displacement pilot pump for supplying a pilot signal pressure to a control valve for a working device such as a boom, thereby making the construction thereof compact to reduce its cost.

Another object of the present invention is to provide a hydraulic circuit for heavy equipment capable of preventing power loss by removing a sequence valve from a flow path between a hydraulic pump and a solenoid valve which controls a hydraulic fluid to be supplied to an actuator such as a boom cylinder.

In order to accomplish these objects, there is provided a hydraulic circuit for heavy equipment, according to the present invention, which includes first to third hydraulic pumps connected to an engine; a first control valve installed in a flow path of the first hydraulic pump, and controlling a hydraulic fluid to be supplied to an actuator that drives a working device when shifting; a second control valve installed in a flow path of the second hydraulic pump, and controlling hydraulic fluid to be supplied to an actuator that drives a working drive when shifting; a hydraulic motor connected to the third hydraulic pump; a cooling fan, connected to the hydraulic motor, for discharging cooling wind to an oil cooler which is installed in a return path of the first and second hydraulic pump to cool the hydraulic fluid to be returned to a hydraulic tank; a temperature sensor for detecting a temperature of the hydraulic fluid in the hydraulic tank; an electric relief valve, installed in a drain flow path of the third hydraulic pump, for controlling hydraulic pressure that drives the hydraulic motor to variably control a rotation velocity of the cooling fan; a controller for varying a set pressure of the electric relief valve in response to a detected signal from the temperature sensor to control the hydraulic pressure that drives the hydraulic motor; and a pilot pressure generator, installed in a pilot flow path branched and connected to a flow path of the third hydraulic pump, for supplying a pilot signal pressure to the first and second control valves when shifting.

According to a preferred embodiment of the present invention, the hydraulic circuit further includes a pressure reducing valve, installed in the pilot flow path, for supplying the hydraulic fluid from the third hydraulic pump to the pilot pressure generator as a pilot signal pressure by a set pressure of a valve spring, the pressure reducing valve being shifted to drain the hydraulic fluid to the hydraulic tank when a load exceeding the set pressure of the valve spring is generated in the pilot pressure generator.

The hydraulic circuit further includes a relief valve installed in the pilot flow path between the pressure reducing valve and the pilot pressure generator.

A pressure of the relief valve is set to be higher than the set pressure of the pressure reducing valve, so that the hydraulic fluid of the drain path is prevented from being discharged to the hydraulic tank through the relief valve when a load pressure exceeding the set pressure of the relief valve is not generated in the drain flow path at a downstream of the pressure reducing valve.

With the above description, the hydraulic circuit can prevent power loss by removing a separate constant displacement pilot pump for supplying the pilot signal pressure to the control valve, thereby making the construction thereof compact to reduce its cost.

Also, the hydraulic circuit can prevent power loss by removing a sequence valve from the flow path between the hydraulic pump and the solenoid valve which controls a hydraulic fluid to be supplied to an actuator.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 3:
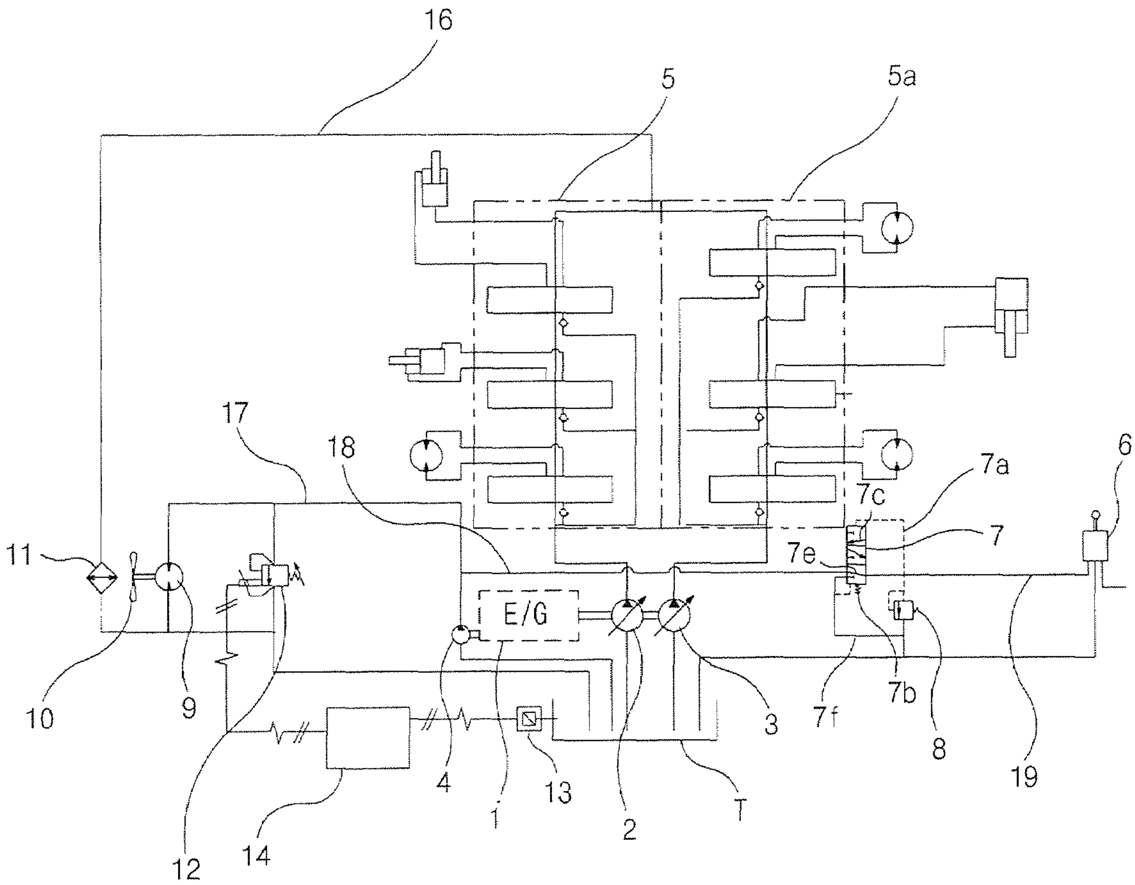
FIG. 3 is a circuit diagram of a hydraulic circuit for heavy equipment according to an embodiment of the present invention.

FIG. 3 is a circuit diagram of a hydraulic circuit for heavy equipment according to an embodiment of the present invention.

The hydraulic circuit according to the present invention includes first and second variable displacement hydraulic pumps 2 and 3 and a third constant displacement hydraulic pump 4 which are connected to an engine 1; a first control valve 5 installed in a flow path of the first variable displacement hydraulic pump 2 and controlling a hydraulic fluid to be supplied to an actuator that drives a working device, such as a boom, a bucket, a traveling device, or the like, by using a pilot signal pressure supplied from the third hydraulic pump 4; a second control valve **5*a* installed in a flow path of the second variable displacement hydraulic pump 3 and controlling a hydraulic fluid to be supplied to an actuator that drives a working drive, such as a swivel device, an arm, a traveling device, or the like, by using a pilot signal pressure supplied from the third hydraulic pump 4; a hydraulic motor 9 connected to the third constant displacement hydraulic pump 4; a cooling fan 10, connected to and rotated by the hydraulic motor 9, for discharging cooling wind towards an oil cooler 11 which is installed in a return path 16, to cool the hydraulic fluid to be drained to a hydraulic tank T; a temperature sensor 12 for detecting a temperature of the hydraulic fluid of the hydraulic tank T; an electric relief valve 12, installed in a drain flow path 17 of the third hydraulic pump 4, for controlling the hydraulic pressure that drives the hydraulic motor 9, to variably control rotation velocity of the cooling fan 10; a controller 14 for varying a set pressure of the electric relief valve 12 in response to a detected signal from the temperature sensor 13 to control the hydraulic pressure that drives the hydraulic motor 9; and a pilot pressure generator 6 installed in a pilot flow path 18 connected to a flow path of the third hydraulic pump 4**.

A pressure reducing valve 7 is installed in the pilot flow path 18 to supply the hydraulic fluid to the pilot pressure generator 6 from the third hydraulic pump 4 as a pilot signal pressure by a set pressure of a valve spring 7*b*. When a load exceeding the set pressure of the valve spring 7*b* is generated in the pilot pressure generator 6, the pressure reducing valve 7 is switched to drain the hydraulic fluid to the hydraulic tank T.

A relief valve 8 is installed in the pilot flow path 18 between the pressure reducing valve 7 and the pilot pressure generator 6.

By setting the set pressure of the relief valve 8 relatively higher than the set pressure of the pressure reducing valve 7, it is possible to prevent the hydraulic fluid of the drain path 19 from discharged to the hydraulic tank T through the relief valve 8, in case where the load pressure exceeding the set pressure is not generated in the drain path 19 at a downstream side of the pressure reducing valve 7.

Figure 1:
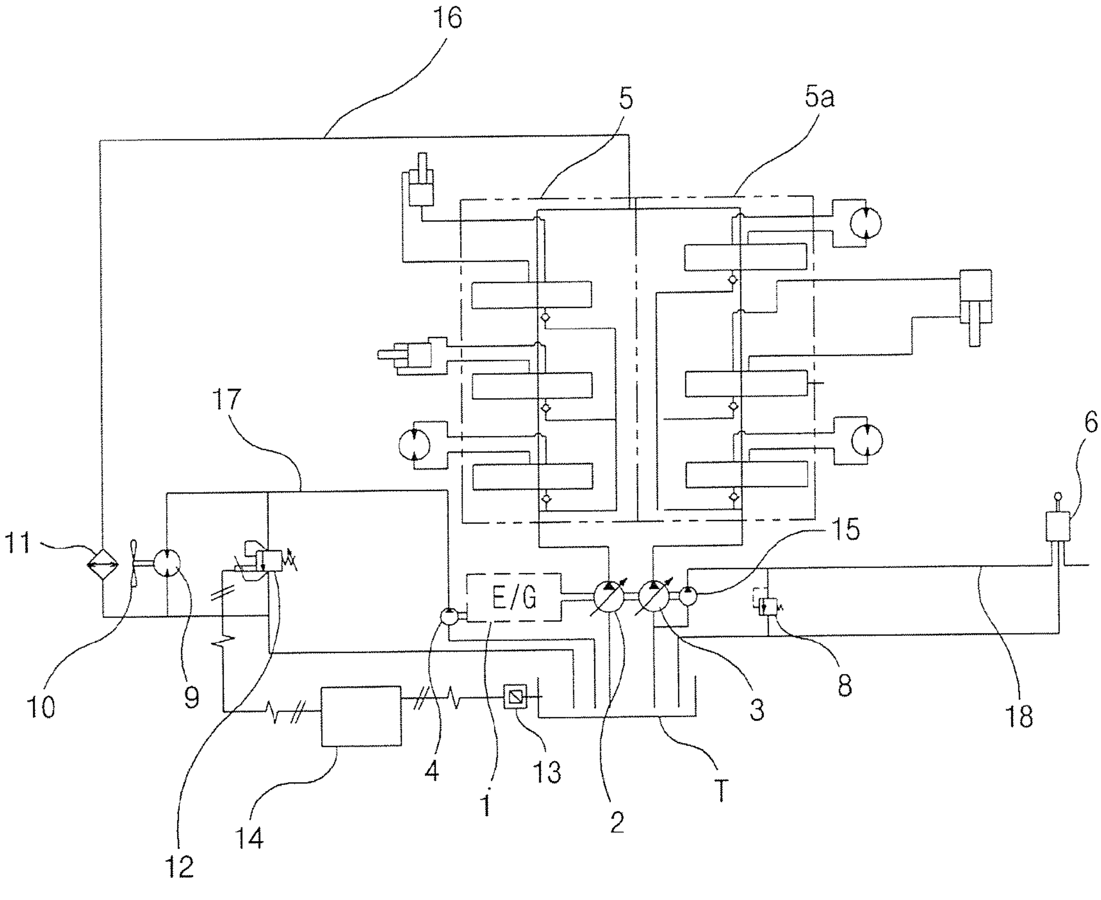
Fig. 1 Prior Art
FIG. 1 is a circuit diagram of a conventional hydraulic circuit for heavy equipment.
Figure 2:
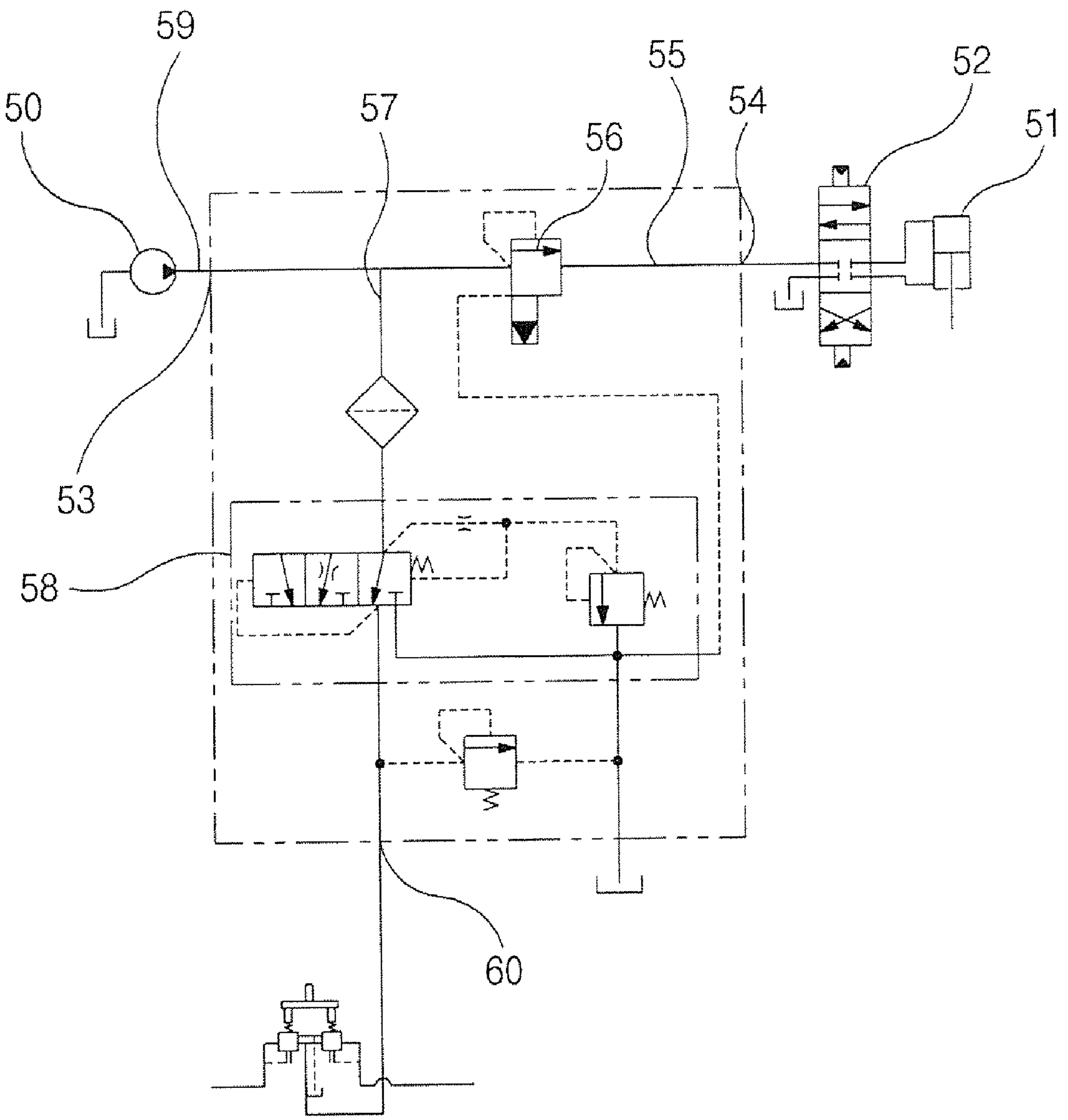
Fig. 2 Prior Art
FIG. 2 is a circuit diagram of another conventional hydraulic circuit for heavy equipment.

Since the construction of the third constant displacement hydraulic pump 4 connected to the engine 1, the pressure reducing valve 7 installed in the pilot flow path 18 to supply the hydraulic fluid to the pilot pressure generator 6 in accordance with the set pressure of the valve spring 7*b* or drain the hydraulic fluid of the drain path 19 to the hydraulic tank T, and the relief valve 8 preventing the hydraulic fluid from being discharged to the hydraulic tank T as the load pressure exceeding the set pressure is not generated in the drain path 19 is substantially equal to that shown in FIG. 1, its detailed description will be omitted herein, in which the same parts are denoted by the same reference numerals.

The operation of the hydraulic circuit for the heavy equipment according to the present invention will now be described with reference to FIG. 3.

As shown in FIG. 3, the hydraulic motor 9 is driven by the hydraulic fluid supplied from the third hydraulic pump 4 along the drain path 17, and as the cooling fan 10 is driven by the hydraulic motor 9, the cool blast is discharged towards the oil cooler 11. Thus, the temperature of the hydraulic fluid passing through the oil cooler 11 installed in the return path 16 and returned to the hydraulic tank T from the actuator can be lowered.

In this instance, a part of the hydraulic fluid discharged from the third hydraulic pump 4 is supplied to the pilot pressure generator 6 through the pressure reducing valve 7 installed in the pilot flow path 18 connected to the drain path 17.

In case where the pilot pressure generator 6 is maintained in a neutral position, the first and second control valves 5 and 5*a* are maintained in a neutral position, and thus the hydraulic fluid discharged from the first and second hydraulic pumps 2 and 3 is returned to the hydraulic tank T via the first and second control valves 5 and 5*a*, the return path 16 and the oil cooler 11 in order.

When the pilot pressure generator 6 is switched, the hydraulic fluid discharged from the third hydraulic pump 4 is supplied to the first and second control valves 5 and 5*a* as a pilot signal pressure to shift the inner spools thereof. Therefore, the hydraulic fluid discharged from the first and second hydraulic pumps 2 and 3 is supplied to the actuator via the first and second control valves 5 and 5*a* to drive the working device such as a boom.

The pressure of the hydraulic fluid to be supplied to the pilot pressure generator 6 from the third hydraulic pump 4 along the pilot flow path 18 can be maintained in a level of the set pressure of the valve spring 7*b*.

More specifically, if the urging force of the valve spring 7*b* is higher than the pressure generated in the drain path 19, the inner spool of the pressure reducing valve 7 is upwardly urged when viewing in the drawing to communicate the inlet flow path (i.e. the pilot flow path 18) with the outlet flow path (i.e. the drain path 19) in the pressure reducing valve 7 by the connection passage 7*e* of the pressure reducing valve 7, which is shown in FIG. 3.

If the urging force of the valve spring 7*b* is lower than the pressure generated in the drain path 19, the pressure of the drain path 19 is transmitted to the upper end of the pressure reducing valve 7 via a signal passage 7*a*, and thus the inner spool of the pressure reducing valve 7 is downwardly urged when viewing in the drawing to intercept the inlet flow path from the outlet flow path in the pressure reducing valve 7. As a result, the hydraulic fluid of the drain path 19 is drained to the hydraulic tank T via the passage 7*c* of the pressure reducing valve 7 which is communicated with a drain passage 7*f*.

Consequently, the pressure of the outlet flow passage (i.e. the drain path 19) of the pressure reducing valve 7 can be maintained in the level of the set pressure of the valve spring 7*b* in the pressure reducing valve 7.

Meanwhile, if the load exceeding the set pressure is generated in the drain path 19, the hydraulic fluid is drained to the hydraulic tank T via the relief valve 8 installed in the drain path 19.

As the set pressure of the relief valve 8 is relatively higher than the urging pressure of the valve spring 7*b* in the pressure reducing valve 7, it is possible to prevent the hydraulic fluid of the drain path 19 from being drained to the hydraulic tank T via the relief valve 8, in case where the load pressure exceeding the set pressure is not generated in the drain path 19.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A hydraulic circuit for heavy equipment, comprising:

first to third hydraulic pumps connected to an engine;

a first control valve installed in a flow path of the first hydraulic pump, and controlling a hydraulic fluid to be supplied to an actuator that drives a working device when shifting;

a second control valve installed in a flow path of the second hydraulic pump, and controlling hydraulic fluid to be supplied to an actuator that drives a working drive when shifting;

a hydraulic motor connected to the third hydraulic pump;

a cooling fan, connected to the hydraulic motor, for discharging cooling wind to an oil cooler which is installed in a return path of the first and second hydraulic pump to cool the hydraulic fluid to be returned to a hydraulic tank;

a temperature sensor for detecting a temperature of the hydraulic fluid in the hydraulic tank;

an electric relief valve, installed in a drain flow path of the third hydraulic pump, for controlling hydraulic pressure that drives the hydraulic motor to variably control a rotation velocity of the cooling fan;

a controller for varying a set pressure of the electric relief valve in response to a detected signal from the temperature sensor to control the hydraulic pressure that drives the hydraulic motor; and a pilot pressure generator, installed in a pilot flow path branched and connected to a flow path of the third hydraulic pump, for supplying a pilot signal pressure to the first and second control valves when shifting.

2. The hydraulic circuit of claim 1, further comprising a pressure reducing valve, installed in the pilot flow path, for supplying the hydraulic fluid from the third hydraulic pump to the pilot pressure generator as a pilot signal pressure by a set pressure of a valve spring, the pressure reducing valve being shifted to drain the hydraulic fluid to the hydraulic tank when a load exceeding the set pressure of the valve spring is generated in the pilot pressure generator.

3. The hydraulic circuit of claim 2, further comprising a relief valve installed in the pilot flow path between the pressure reducing valve and the pilot pressure generator.

4. The hydraulic circuit of claim 3, wherein a pressure of the relief valve is set to be higher than the set pressure of the pressure reducing valve, so that the hydraulic fluid of the drain path is prevented from being discharged to the hydraulic tank through the relief valve when a load pressure exceeding the set pressure of the relief valve is not generated in the drain flow path at a downstream of the pressure reducing valve.

* * * * *